INVENTORS
Thomas L. Francis
Charles L. Kettler
& George P. Sarrafian
BY
Stevens, Davis, Miller & Mosher
ATTORNEYS INVENTORS
Thomas L. Francis
Charles L. Kettler
& George P. Sarrafian
BY
Stevens, Davis, Miller & Mosher
ATTORNEYS INVENTORS
Thomas L. Francis
Charles L. Kettler
& George P. Sarrafian
BY Stevens, Davis, Miller & Mosher
ATTORNEYS INVENTORS
Thomas L. Francis
Charles L. Kettler
& George P. Sarrafian
BY Stevens, Davis, Miller & Mosher
ATTORNEYS INVENTORS
Thomas L. Francis
Charles L. Kettler
& George P. Sarrafian BY Stevens, Davis, Miller & Mosher
ATTORNEYS 3,097,342

JUMP DRIVE FOR COMPUTER DISTRIBUTOR COMPRISING MAGNETRON BEAM SWITCHING TUBES

Thomas L. Francis, Richardson, and Charles L. Kettler and George P. Sarrafian, Dallas, Tex., assignors to Texas Instruments Incorporated, Dallas, Tex., a corporation of Delaware Filed July 14, 1960, Ser. No. 42,830
8 Claims. (Cl. 328—103)

This invention relates to a system and circuitry for providing a jump operation on a computer program step distributor which is made up of magnetron beam switching tubes.

This invention is for use in combination with a computer, such as that disclosed in the copending application, Serial No. 784,358, filed December 31, 1958, invented by George T. Baker, Charles L. Kettler, and George P. Sarrafian. In this copending application, there is disclosed a computer which will carry out commands to perform arithmetic operations in a predetermined sequence as controlled by a distributor and plugboard. The distributor has a large number of positions and produces output pulses from these positions in sequence. By means of the plugboard, the output pulses from these positions may be selectively applied to different inputs which control the giving of commands to the computer. In this manner, any desired sequence of commands may be given. Most complete computer programs require a sequence of commands which is much greater than the distributor has outputs. Fortunately, many of the subsequences of commands in a complete computer program are repeated several times in the program. By means of a jump operation, the distributor can be made to jump out of sequence to repeat certain subsequences of command. The use of such jump operations reduces the amount of time to program the computer and permits long programs to be carried out using a distributor with much fewer positions than would otherwise be required.

The distributor used in the present invention comprises a plurality of magnetron beam switching tubes. Each of the beam switching tubes comprises a high vacuum multi-position electronic switch, which can be switched from position to position at a high rate of speed. A magnetron beam switching tube is essentially a magnetron which is capable of forming and holding an electron beam in a predetermined position. This electron beam can be rotated from position to position sequentially at a high rate of speed, and in this manner, pulses can be produced from outputs of the tube sequentially and at a high rate of speed. Prior to the present invention, circuits were known which connect these magnetron beam switching tubes together to provide a distributor with a large number of positions. Such a distributor would then produce output pulses from these positions sequentially and at a high rate of speed. However, prior to the present invention, there was no circuitry available to perform jump operations on such a distributor. The present invention is a system and circuit for use with such a distributor to perform jump operations.

Further objects and advantages of this invention will become readily apparent as the following detailed description of a preferred embodiment of the invention unfolds and when taken in conjunction with the drawings wherein.

The distributor of the present invention makes use of a plurality of magnetron beam switching tubes which are connected together to provide 128 distributor positions. The magnetron beam switching tubes are manufactured by Burroughs Corporation, and are fully disclosed in U.S. Patents No. 2,721,955, No. 2,764,711, and No. 2,804,568.

Figure 1:
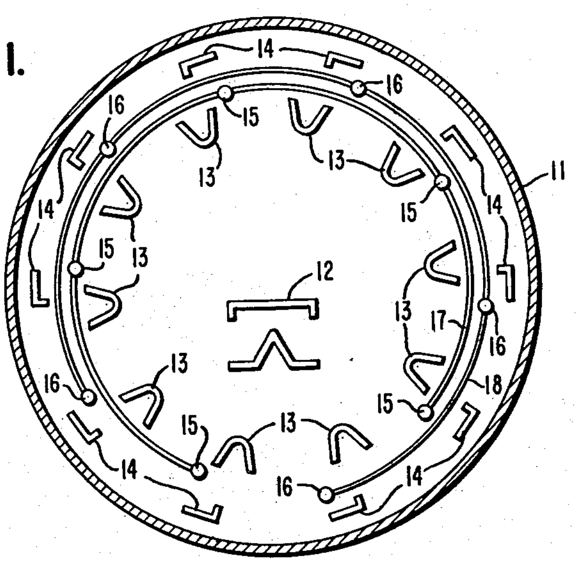
FIGURE 1 shows schematically a top cross-sectional view of a magnetron beam switching tube which, together with a plurality of other identical tubes, comprise the distributor used in the present invention.

A magnetron beam switching tube comprises a high vacuum, ten-position electron switch. In FIGURE 1, which shows the configuration of a magnetron beam switching tube, a high vacuum is provided within a casing 11. A cathode 12 is positioned in the center of the casing 11. Positioned circumferentially around the cathode 12 are 10 U-shaped electrodes 13, which are called spades. Positioned radially in back and to clockwise side of each spade 13 is an electrode 14, which is called a target, making a total of ten targets 14 in the tube. Positioned in front of each target 14 is an electrode which is referred to as a grid. The grids are divided into two groups with the grids of one group being designated by the reference number 15 and the grids of the other group being designated by the reference number 16. The grids 15 are positioned in front of every other target 14 and the grids 16 are positioned in front of the alternate targets 14. The grids 15 are all connected together by means of a conductor 17 and the grids 16 are all connected together by means of a conductor 18.

In operation the targets 14 and the spades 13 will be biased with a high positive voltage with respect to the cathode 12. One set of grids, either the grids 15 or the grids 16, will have a relatively small positive voltage of about 25 volts applied thereto with respect to the cathode, and the other set of grids will have a relatively small negative voltage of about 25 volts applied thereto with respect to the cathode.

The tube essentially is a magnetron which is capable of forming an electron beam and holding it in one position. When the electron beam is formed and is held in one position it will be locked on one of the targets 14. The electron beam will originate from the cathode 12 and travel over to the selected target 14. The grid in front of this selected target will be one of those to which positive voltage is applied. The electron beam can be switched to the next clockwise target in the tube simply by reversing the potential on the conductors 17 and 18, which respectively connect the grids 15 and 16 together.

The electron beam can be extinguishd from the tube by a process which is referred to as clearing the tube, which process consists of raising the potential of the cathode 12 to equal or approach that of the spades 13. In order to form an electron beam in the tube after it has been cleared, the potential of just one of the spades 13 is lowered to equal or approach that of the cathode. The selected target on which the beam forms will be the one behind the spade the potential of which is lowered. The grid in front of the selected target must be one which has a positive voltage applied thereto.

Figure 2:
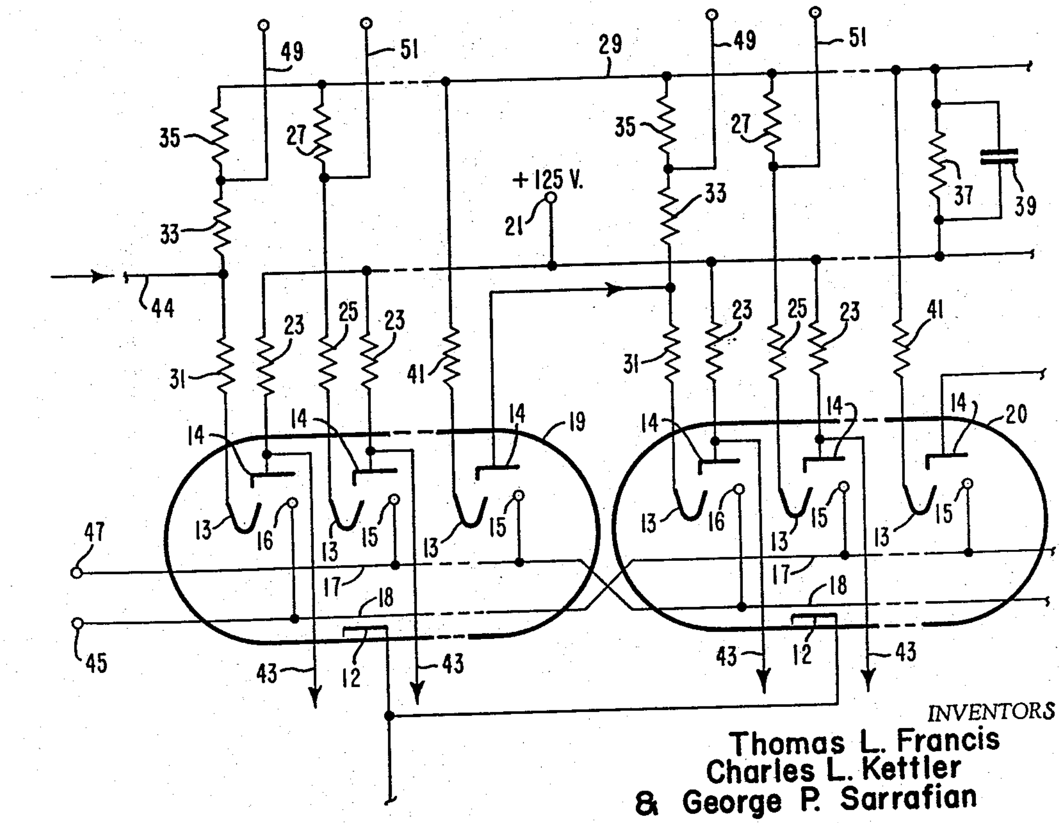
FIGURE 2 is a circuit diagram illustrating how the magnetron beam switching tubes are connected together to form the distributor.

FIGURE 2 illustrates how a plurality of the beam switching tubes are connected together to form a distributor with a large number of positions. In this figure only two beam switching tubes 19 and 20 and their interconnection are shown. The tube 20 is connected to the first of a series of additional beam switching tubes in exactly the same manner as that in which the tube 19 is connected to the tube 20, and each adjacent pair of tubes in this series of tubes are likewise connected together in this same manner.

A 6.8 kilohm resistor 23 connects each target 14 except the last target on the right in each tube to a source of +125 volts applied at terminal 21. A 130 kilohm resistor 25 is connected to each spade 13 except the first spade on the left and the last spade on the right in each tube. A 10 kilohm resistor 27 is connected in series with each resistor 25, and each resulting series circuit is connected between the respective spade 13 and a conductor 29. The first spade 13 on the left in each tube is connected to the conductor 29 over a series circuit which comprises a 27 kilohm resistor 31, a 100 kilohm resistor 33, and a 10 kilohm resistor 35. The last spade 13 on the right in each tube is connected to the conductor 29 by a 47 kilohm resistor 41. The supply voltage of 125 volts at terminal 21 is connected to the conductor 29 over a parallel circuit comprising a 12 kilohm resistor 37 and a 1500 $\mu\mu$ farad capacitor 39. The conductor 18 in the tube 19 is connected directly to the conductor 17 in the tube 20 and the conductor 17 in the tube 19 is connected directly to the conductor 18 in the tube 20. The last target 14 on the right in the tube 19 is connected directly to the junction between the resistors 31 and 33 which are connected in series to the first spade on the left in tube 20.

Each target, spade, and grid assembly, except the last target, spade, and grid on the right in each tube comprises a distributor position. The last assembly on the right in each tube is not used as a distributor position because the target of this assembly is used to cause the formation of an electron beam in the next beam switching tube of the distributor as is described below.

A distributor output is taken by means of conductors 43 from each of the targets 14 except the last target on the right in each tube. When the electron beam is switched to one of these first nine targets on the left, current will start to flow through the resistor 23 connected to the target and therefore the potential at the target will drop. This drop in potential appears on the conductor 43 connected to this target as an output pulse from the distributor.

At the start of operation of the distributor, an electron beam will be formed on the first target 14 on the left in tube 19. No electron beam will be formed in the tube 20 or in any other tube of the series comprising the distributor. At this time a potential about 25 volts higher than the cathode potential will be applied to terminal 45, which is connected to the conductor 18 in tube 19, and a potential about 25 volts below the cathode potential will be applied to terminal 47, which is connected to the conductor 17 in the tube 19. To switch the electron beam to the next target 14 on the right, the potentials applied at terminals 45 and 47 are reversed. Each time the potentials applied to the terminals 47 and 45 are reversed, the beam formed in tube 19 will switch to the next target 14 on the right until it reaches the tenth and last target on the right in the tube 19. When the beam reaches the last target 14 on the right in the tube 19, current will flow through the resistors 35 and 33 connected to the first spade 13 on the left in tube 20. This action will cause the potential of this spade 13 to drop to be equal approximately to the cathode potential of the tube 20, and therefore an electron beam will form on the first target 14 on the left in the tube 20. Resistors 33, 35, and 41 put tube 19 in an unstable operating mode, causing the beam to clear automatically from tube 19. The clearing time is long enough so the new beam still forms in tube 20. This time is critical and is controlled by resistor 41. After the electron beam is formed in the tube 20, it can be switched sequentially from target to target by reversing the potentials at terminals 45 and 47 in the same manner that the electron beam was advanced through the tube 19. When the electron beam reaches the last target 14 on the right in the tube 20, it will automatically cause an electron beam to be formed on the first target on the left in the next beam switching tube of the distributor in the same manner as the electron beam was automatically formed in the tube 20 when the electron beam reached the last target on the left in the tube 19. Similarly, the tube 20 will be automatically cleared in the same manner that the tube 19 was cleared. In this manner, negative pulses are sequentially produced on the conductors 43. This process of causing the distributor to produce output pulses sequentially on the conductors 43 is referred to as advancing the distributor.

The electron beam is intially formed on the first target on the left in the tube 19 by means of a conductor 44 which is connected to the junction between the resistors 31 and 33 connected in series to the first spade on the left in the tube 19. A negative pulse applied to the conductor 44 will lower the potential of this spade to equal the cathode potential of the tube 19 and thus cause an electron beam to be formed on the first target on the left in tube 19.

In operation the distributor, in addition to producing pulses from the leads 43 sequentially, must be capable of performing jump operations. In a jump operation, the next output pulse from the distributor, instead of being produced from the next sequential position, is produced from any selected position. To accomplish this jump operation the electron beam is extinguished from whichever tube it is in by raising the cathode potential of all the beam switching tubes to equal or approach that of the spades and a new electron beam is formed on the target 14 at the selected position. Conductors 49 and 51 are used in forming the new electron beam. The conductors 49 are each connected to the junction between a pair of resistors 33 and 35 and the conductors 51 are each connected to the junction between a pair of resistors 25 and 27. If it is desired to form an electron beam at the first position on the left in one of the beam switching tubes, a negative pulse will be applied to the conductor 49 which is connected by resistors 33 and 31 to the spade of the selected position. The applied negative pulse will cause the potential of the spade to drop to equal that of the cathode of that tube and an electron beam will form on the target of the selected position in back of this spade. If the selected position is one of the other positions, a negative pulse will be applied to that conductor 51 which is connected by a resistor 25 to the spade of the selected position. The applied negative pulse will cause the potential of the spade to drop to equal the cathode potential and an electron beam will be formed on the target of the selected position back of the spade.

Figure 3:
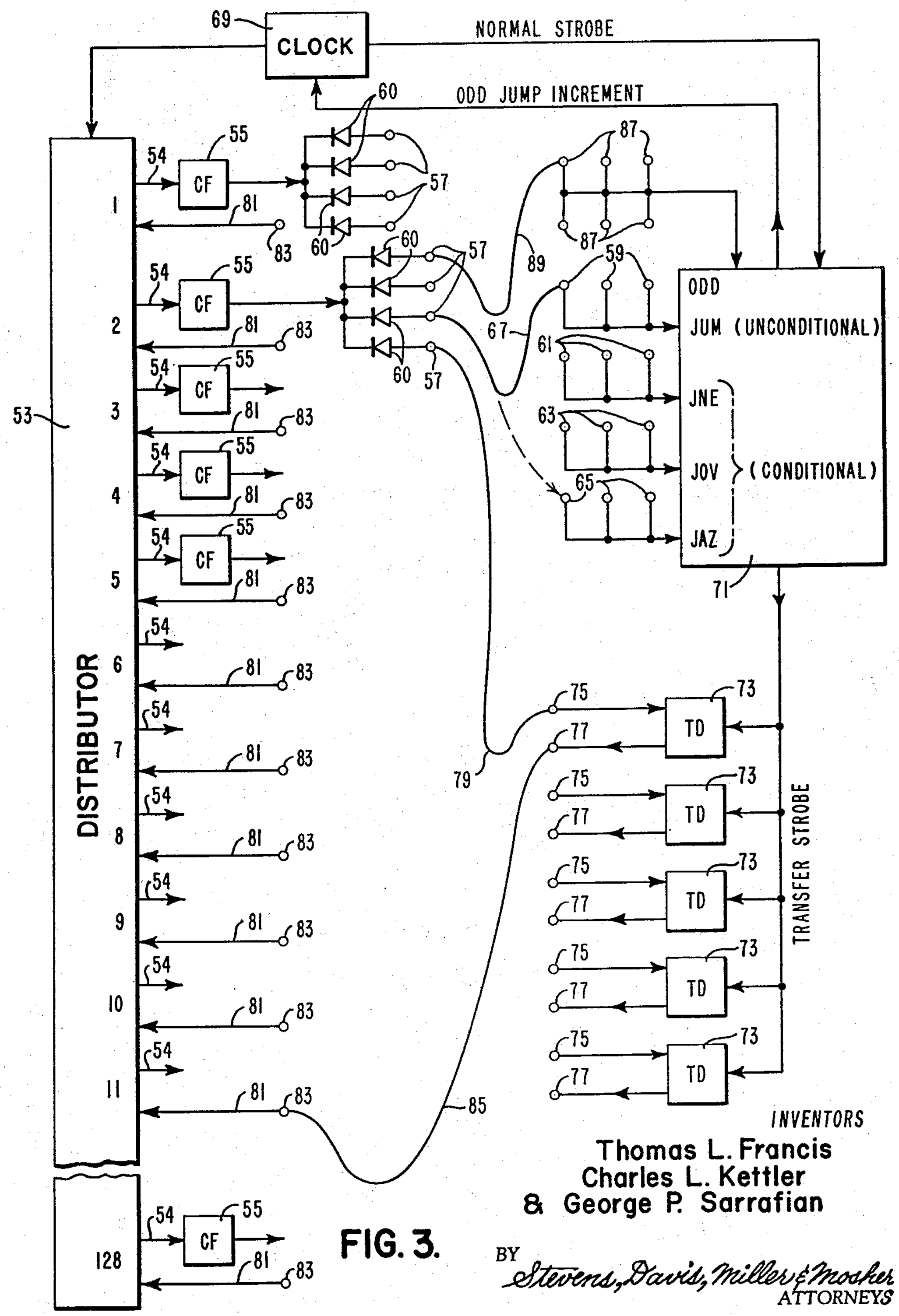
FIGURE 3 is a block diagram of the circuits for performing a jump operation on the distributor.

FIGURE 3 illustrates in block form the circuitry for performing a jump operation. In this figure the distributor, designated by the reference number 53, produces negative output pulses sequentially on outputs 54. The distributor 53 is advanced by a clock 69, which carries out this action by reversing the potentials applied at terminals 45 and 47 shown in FIGURE 2. The outputs 54 receive output pulses from the conductors 43 shown in the circuit of FIGURE 2. The pulse produced at each of the outputs 54 is applied through a cathode follower 55 to four hubs 57 on a plugboard. The connection from the output of the cathode follower to each hub is made through a diode 60, which has its cathode connected to the respective hub 57 and its anode connected to the output of the respective cathode follower 55. To simplify the drawings, the complete circuitry between the outputs 54 of the distributor 53 and the hubs 57 have only been shown for the first two outputs since the circuitry is identical for all of the outputs. The hubs 57 are mounted on a plugboard and comprise means by which plugboard connections may be made. Other hubs on the plugboard (not shown) are connected to command inputs of the computer. Each of the command inputs of the computer controls a different command for the computer. When a negative pulse is applied to one of the command inputs, the command controlled by that input is given, and the computer will perform a predetermined operation in accordance with the command given. The hubs 57, on which the output pulses from the distributor appear, may be selectively connected to any of the hubs which are connected to the command inputs. Thus by means of the plugboard, the computer may be programed to perform in accordance with any desired sequence of commands.

In addition to these commands for controlling the operation of the computer, there are specialized commands for controlling jump operations on the distributor 53. These specialized commands are designated JUM, JNE, JOV, and JAZ. When the command JUM is given, it will cause the distributor 53 to jump out of sequence to any selected position so that the next output pulse comes from the output 54 at the selected position. The commands JNE, JOV, and JAZ each will cause the distributor to perform a jump operation to any selected position if and only if certain conditions are present. In FIGURE 3 the hubs 59 are connected to the input controlling the command JUM. When a negative pulse is applied to the input controlling the command JUM, the distributor will perform a jump operation unconditionally. Hubs 61, 63, and 65 are connected to the inputs which control the commands JNE, JOV, JAZ, respectively. Whenever a negative pulse is applied to one of these inputs the distributor will perform a jump operation if the required condition is present. The hubs 57 may be selectively connected to any of the hubs 59, 61, 63, or 65 by means of the plugboard, and thus the commands JUM, JNE, JOV, and JAZ may be programed into the sequence of commands as desired. In FIGURE 3, one of the hubs 57 which receive pulses from the second position of the distributor 53 is shown connected to one of the hubs 59 by means of a plugboard lead 67.

When the command JUM is given, or one of the commands JNE, JOV, or JAZ is given and the required condition is present, jump logic circuitry 71 will produce a transfer strobe pulse which is applied to the strobe inputs of transfer drivers 73. These transfer drivers 73 each have a control input which is connected to a hub 75 on the plugboard. When one of the transfer drivers 73 receives a strobe pulse at its strobe input and also receives a negative pulse at its control input, it will produce a negative pulse at its output, which is connected to a hub 77 on the plugboard. The hub 75 may be selectively connected to any of the hubs 57 by means of the plugboard. When a plugboard connection is made between one of the hubs 57 and one of the hubs 59, 61, 63, or 65, another plugboard connection will be made between one of the hubs 75 and another of the hubs 57 which receive output pulses from the same distributor position. Thus, when the command JUM or one of the commands JNE, JOV, or JAZ is given and the required condition is present, one of the transfer drivers will be selected to receive a negative pulse on its control input at the same time it receives a transfer strobe pulse on its strobe input. This selected transfer driver 73 will then produce a negative pulse at the hub 77 connected to its output. In FIGURE 3, one of the hubs 57 which receive output pulses from the second distributor position is shown connected to one of the hubs 75 by means of a plugboard 79.

At each of the positions of the distributor, there is an input 81 which is connected to one of the conductors 49 or 51, which are shown in FIGURE 2. Each input 81 is connected to that conductor 49 or 51 which controls the lowering of the potential of the spade 13 at that position. Each of the conductors 81 is connected to a hub

83 on the plugboard, and any of the hubs 77 may be selectively connected to any of the hubs 83 by means of the plugboard. When one of the commands JUM, JNE, JOV, and JAZ is given and one of the transfer drivers 73 is selected by appropriate plugboard connections, a plugboard connection will be made between the hub 77 connected to the output of the selected transfer driver 73 and one of the hubs 83. The selected hub 83 will be connected to the input 81 at the position to which the jump operation will be made. When the selected transfer driver 73 produces a negative output pulse, it will be applied to the input 81 at the distributor position selected in this manner and thus cause a lowering of the potential of the spade 13 at the selected position to equal that of the cathode. An electron beam will therefore be formed on the target 14 at the selected position, and therefore the next negative output pulse from the distributor will be produced from the selected position. In FIGURE 3, a plugboard lead 85 is shown connected between the hub 77 connected to the output of the selected transfer driver 73 and the hub 83 connected to the input 81 at the eleventh position of the distributor.

Each time the clock 69 advances the distributor 53 to a jump programed step, it also applies a distributor output pulse to the jump logic circuitry 71. The jump logic circuitry 71 will not produce its output transfer pulse until after it has received the normal strobe pulse from the clock 69. The normal strobe pulses are narrower than the output pulses from the distributor, and the normal strobe pulses each begin after the corresponding distributor pulse has begun. The normal strobe pulse serves to provide precise timing and synchronization for the operation of the jump logic circuitry 71. The normal strobe pulse is also used to provide precise synchronization and timing for the other commands controlling the operations of the computer. The operations directed by one of these other commands, after it has been given by the application of a distributor pulse to the input controlling the command, will not begin until the normal strobe pulse is generated by the clock 69. The normal strobe pulse can be used to cause the operation directed by a command to be repeated several times. If the distributor is stopped in one position by stopping the clock 69 from advancing the distributor 53, yet permitting the clock to continue to run so that the normal strobe pulse is periodically generated, the operation directed by the command which is controlled by the input which, in turn, receives the distributor pulse from the position at which the distributor is stopped will be repeated each time the normal strobe pulse is generated. This command will be the one controlled by the input which receives the distributor pulse from the position at which the distributor is stopped.

When a jump operation is being carried out, the clock 69 is stopped so that it does not continue to advance the distributor 53 and to generate normal strobe pulses. After the jump operation has been performed, the clock is restarted so that the negative pulses will again be produced sequentially from the distributor starting from the position to which the jump was made.

When a jump operation is performed, the grid 15 or 16, shown in FIGURE 2, in front of the target 14 at the selected position must be one of the ones which are at a positive potential with respect to the cathode. If the jump is made over an even number of positions, the grid in front of the selected target will be positive. However, if the jump is made over an odd number of positions, the grid in front of the selected target would normally be at a negative potential with respect to the cathode. Therefore, whenever a jump is made over an odd number of positions, it is necessary to increment the clock 69 so that it reverses the potentials applied at terminals 45 and 47. The clock is incremented by making a plugboard connection between one of a set of hubs 87 on the plugboard and one of the hubs 57 which receive pulses from the distributor position at which the jump over an odd number of positions is programed. The hubs 87 are connected to the odd jump input of the jump logic circuitry 71. When the jump logic circuitry 71 receives a distributor pulse on its odd jump input, it will apply an odd jump increment pulse to the clock 69, which in response to this pulse will reverse the potentials at terminals 45 and 47 shown in FIGURE 2. Thus when a jump over an odd number of positions is programed, a distributor pulse will be applied to one of the hubs 87, the clock 69 will be incremented, and the potential of the grid 15 or 16 at the selected position will be made positive. In FIGURE 3 one of the hubs 57 which receive pulses from the second position of the distributor 53 is shown connected to one of the hubs 87 by means of a plugboard lead 89.

In FIGURE 3, the distributor is shown programed by means of plugboard lead 67 to perform an unconditional jump in accordance with the command JUM when an output pulse is produced from the second distributor output 54. The uppermost transfer driver 73 is selected by means of plugboard lead 79 to produce the negative pulse to be applied to one of the input conductors 81. The jump is selected to be made to the eleventh distributor position by means of the plugboard lead 85, and since the jump is to be made over an odd number of positions, the plugboard lead 89 is connected between one of the hubs 87 and one of the hubs 57 which receive distributor pulses from the second position. Thus, when an output pulse is produced from the second position of the distributor 53, a negative pulse will be applied to the input controlling the command JUM. In response thereto, the jump logic circuitry 71 upon receipt of the strobe pulse from the clock 69 will apply a transfer strobe pulse to the transfer drivers 73. The uppermost transfer driver 73 receiving both a transfer strobe pulse and a distributor pulse will produce a negative output pulse which is applied to the input 81 at the eleventh distributor position. A negative pulse will also be applied to the odd jump input of the jump logic circuitry, which in response thereto will apply an odd jump increment pulse to the clock 69. The clock 69 in response thereto is incremented and reverses the potentials at terminals 45 and 47 shown in FIGURE 2. In this manner, a jump is performed from the second distributor position to the eleventh distributor position.

Figure 4:
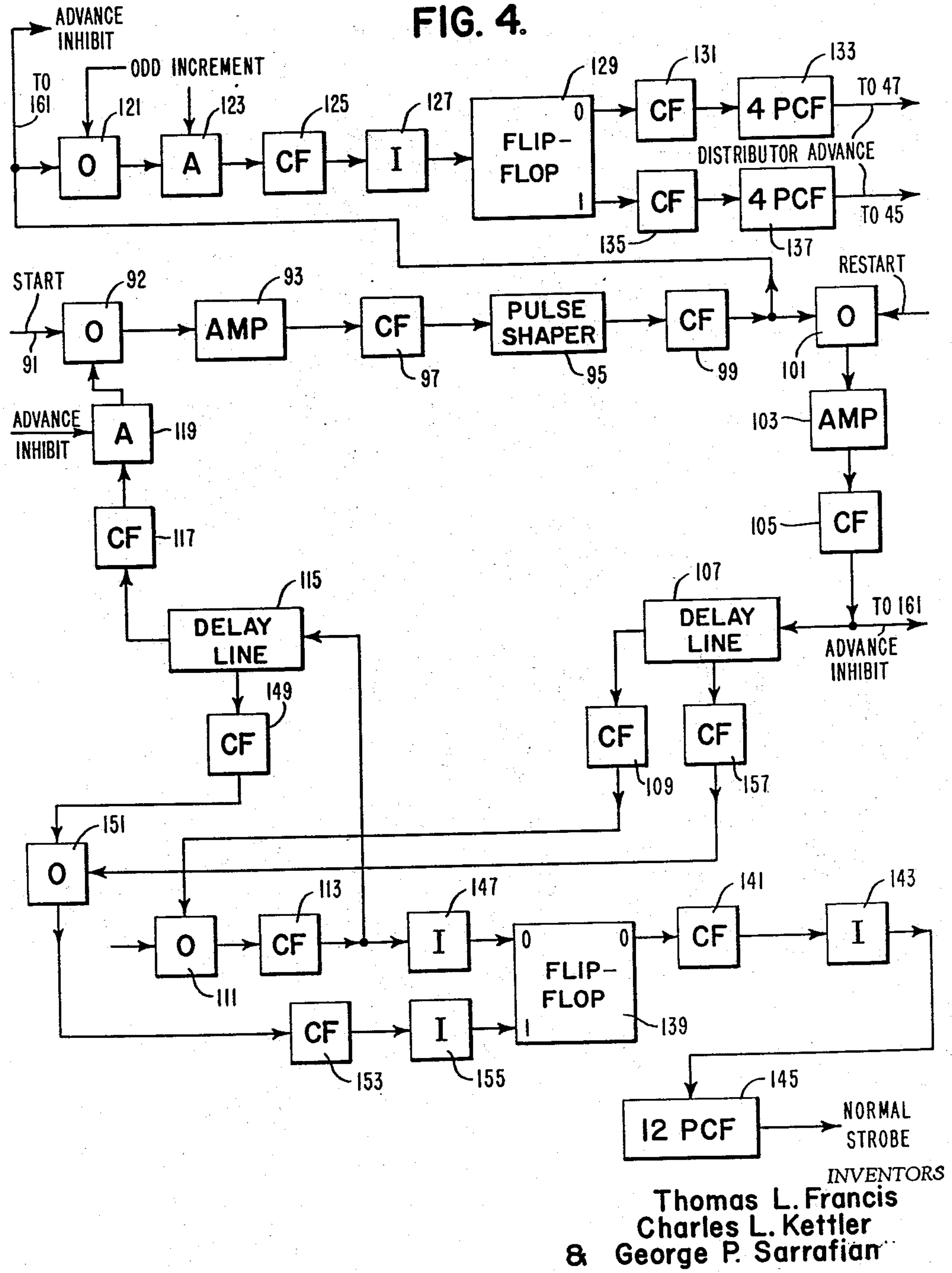
FIGURE 4 is a block diagram illustrating the details of the clock, which is a circuit controlling the sequential operation of the distributor.

The details of the clock 69 are shown in block form in FIGURE 4. To start the clock, a pulse is applied to the external input 91 of the OR gate 92. This pulse will pass through OR gate 92 and be applied to the amplifier 93. The amplifier 93 will widen and sharpen the applied pulse and apply it to a pulse shaper 95 through a cathode follower 97. The pulse shaper 95 is an R L C peaking circuit and its output is buffered by a cathode follower 99. The pulse, after being shaped by pulse shaper 95 and after passing through the cathode follower 99, will pass through an OR gate 101 and then be amplified by an amplifier 103. After being amplified by amplifier 103, the pulse will pass through a buffering cathode follower 105 and be applied to a delay line 107. After passing through the delay line 107, the pulse will pass through a buffering cathode follower 109 and then through an OR gate 111 and a cathode follower 113. After the pulse passes through the cathode follower 113, it will be applied to a delay line 115, and after passing through delay line 115, the pulse will pass through a buffering cathode follower 117 and then through an AND gate 119 to another input of the OR gate 92. The pulse will then be again applied to the amplifier 93, which will again widen and sharpen the pulse, and after this action the pulse will be again shaped by the pulse shaper 95. The pulse will continue to circulate in this manner until it is stopped by the AND gate 119.

During a jump operation the enabling signal is removed from the AND gate 119 to stop the circulating pulse, which action is referred to as stopping the clock. To restart the clock after a jump operation has been performed a pulse will be applied to the external input of the OR gate 101. The pulse thus applied externally to the OR gate 101 will then continue to recirculate in the clock-loop as described.

Each time the pulse passes through the cathode follower 99, in addition to being applied to the OR gate 101, is also applied to the OR gate 121. The pulse, after passing through the OR gate 121, will pass through AND gate 123 and a cathode follower 125 to an inverter 127. The pulse, after being inverted by the inverter 127, is applied to the binary input of a flip-flop 129. Each time the flip-flop 129 receives a pulse applied at its binary input, it will switch to the opposite state. The flip-flop 129 has two outputs which are designated as the ZERO output and the ONE output. When the flip-flop 129 is in one of its stable states, which is designated as the ONE state, the potential from the ONE output will be more positive and when the flip-flop is in the opposite state, which is designated as the ZERO state, the potential from the ZERO output will be more positive. These same designations are used to identify the states and outputs of other flip-flops which shall be described below. These flip-flops also each have a ZERO input and a ONE input. When a pulse is applied to the ZERO input of a flip-flop, it will be switched to its ZERO state, and when a pulse is applied to the ONE input of a flip-flop, it will be switched to its ONE state.

The ZERO output of flip-flop 129 is applied through a buffering cathode follower 131 and four parallel cathode followers 133 to the terminal 45 shown in FIGURE 2. The ONE output of the flip-flop 129 is applied through a buffering cathode follower 135 and four parallel cathode followers 137 to the terminal 47 shown in FIGURE 2. Whenever the flip-flop 129 is in its ZERO state, it will apply from its ZERO output through the cathode follower 131 and the cathode followers 133 to the terminal 45 a potential of about +25 volts with respect to the cathode potential of the beam switching tubes and from its ONE output through the cathode follower 135 and the cathode followers 137 to the terminal 47 a potential of about −25 volts with respect to the cathode potential of the beam switching tubes. Whenever the flip-flop 129 is in its ONE state, it will apply from its ZERO output through the cathode follower 131 and through the cathode followers 133 to terminal 45 a potential of about −25 volts with respect to the cathode potential of the beam switching tubes and from its ONE output through the cathode follower 135 and through the cathode followers 137 to terminal 47 a potential of about +25 volts with respect to the cathode potential of the beam switching tubes.

When a pulse is continuously circulating in the clock-loop comprising the delay lines 107 and 115, the amplifier 93, the pulse shaper 95, and the amplifier 103, pulses will be repetitively applied to the OR gate 121 from the cathode follower 99 at a constant rate. Each of these pulses, upon being applied to the binary input of the flip-flop 129 will cause it to switch to its opposite state. Thus the flip-flop 129 will switch back and forth between its stable states at a constant rate and the potentials applied at terminals 45 and 47 shown in FIGURE 2 will be repetitively reversed at a constant rate. In this manner the distributor is advanced at a constant rate.

When, during a jump operation, the pulse circulating in the clock-loop is stopped and the jump is programed over an odd number of positions, the odd jump increment pulse will be applied to the external input of the OR gate 121. This pulse will pass through the AND gate 123, the cathode follower 125, and the inverter 127 to the binary input of the flip-flop 129 and cause it to switch to its opposite state. In this manner the grid in front of the target at the selected position is made positive when the jump operation is programed over an odd number of positions.

The AND gate 123 is normally enabled and will pass pulses from the OR gate 121. This AND gate is used to stop the switching of the flip-flop 129 when it is desired to have the pulse continuously recirculating in the clock-loop, but maintain the distributor output at one position. The reason for this feature is the fact that the clock-loop is also used to generate the normal strobe pulses and it is sometimes desirable to have the normal strobe pulses continue to be generated while the distributor is not being advanced, for example when the operation directed by one command is to be repeated several times.

The normal strobe pulse is produced from a flip-flop 139. The flip-flop 139 will normally be in its ONE state and to produce the normal strobe pulse, the flip-flop 139 is switched to its ZERO state. When the flip-flop 139 is switched to its ZERO state, it will produce an output pulse from its ZERO output which will pass through a cathode follower 141 and then be inverted by an inverter 143. The inverted pulse from the inverter 143 then passes through twelve parallel cathode followers 145. The output from these twelve parallel cathode followers 145 is the normal strobe pulse.

The flip-flop 139 is switched to its ZERO state by means of the circulating pulse in the clock-loop. When this circulating pulse passes through the cathode follower 113, in addition to being applied to the delay line 115, the pulse is inverted by an inverter 147 and then applied to the ZERO input of the flip-flop 139. This action switches the flip-flop 139 to its ZERO state and causes the generation of the normal strobe pulse. A tap is taken from the delay line 115 and applied to a cathode follower 149. The circulating pulse in the clock-loop will be applied to the cathode follower 149 a short time interval after the flip-flop 139 has been switched to its ZERO state. The pulse applied to the cathode follower 149 will pass through this cathode follower, through an OR gate 151 and through a cathode follower 153 to an inverter 155. After being inverted by the inverter 155, the pulse will be applied to the ONE input of the flip-flop 139. The application of the pulse to the ONE input of the flip-flop 139 will cause the flip-flop 139 to switch to its ONE state. Thus, each time the flip-flop 139 is switched to its ZERO state it will be switched back again to its ONE state a short time interval thereafter. In this manner the normal strobe pulse is produced each time the pulse recirculates in the clock-loop. The width of the strobe pulse is determined by and equal to the delay from the time the circulating pulse is applied to the input of the delay line 115 to the time it reaches the tap on this delay line and is applied to the cathode follower 149. An output is tapped off the delay line 107 and applied to a cathode follower 157. Thus, each time the pulse in the clock-loop passes through the delay line 107, a pulse will be applied to the cathode follower 157. This pulse, after passing through the cathode follower 157, will pass through the OR gate 151, the cathode follower 153, and the inverter 155 to the ONE input of the flip-flop 139. This circuitry assures that the flip-flop 139 is in its one state prior to the application of the pulse to the ZERO input of the flip-flop 139 to switch it to its ZERO state.

When the enabling signal is removed from the AND gate 119 to stop the pulse circulating in the clock-loop, the strobe can be fired by applying a pulse to the external input of the OR gate 111. This pulse will pass through the OR gate 111, the cathode follower 113, and the pulse inverter 147 to the ZERO input of the flip-flop 139 and switch the flip-flop 139 to its ZERO state. After the pulse passes through the cathode follower 113, in addition to being applied to the inverter 147, the pulse is also applied to the delay line 115. After a short delay the pulse will then pass from the tap on the delay line 115 through the cathode follower 149, the OR gate 151, the cathode follower 153, and the inverter 155 to the ONE input of the flip-flop 139 and cause the flip-flop 139 to switch back to its ONE state. In this manner the strobe may be fired when the clock is stopped. It will be noted that when the clock is restarted after a jump operation by the application of a pulse to the external input of the OR gate 101, it will cause the strobe pulse to be fired before the flip-flop 129 is switched to its opposite state. This sequence is necessary because otherwise the strobe would not be fired when the output pulse is produced from the distributor position to which the jump operation is made and the computer operation directed by the command which is given in response to the distributor pulse from this position would not be carried out.

Figure 5:
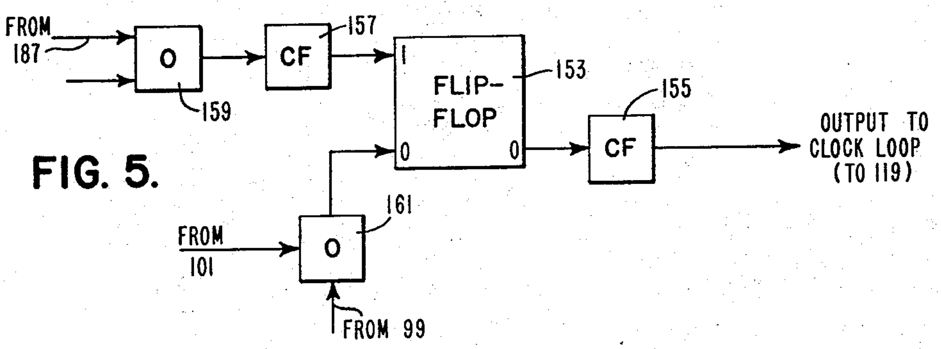
FIGURE 5 is a block diagram of the advance inhibit circuit, which is used to stop the clock and thereby stop the sequential operation of the distributor.

The enabling signal applied to the AND gate 119 permitting the pulse to continuously recirculate in the clock-loop is applied thereto from the advance inhibit circuit, the details of which are shown in FIGURE 5. The advance inhibit circuit comprises a flip-flop 153. The ZERO output of the flip-flop 153 is applied through a cathode follower 155 to the enabling input of the AND gate 119 in FIGURE 4. As long as the flip-flop 153 is in its ZERO state, it will apply an enabling signal from its ZERO output through the cathode follower 155 to the AND gate 119. When the flip-flop 153 is switched to its ONE state it will no longer apply this enabling signal and the recirculating pulse in the clock-loop will be stopped. When a jump operation is to be performed a pulse will be applied through an OR gate 159 and a cathode follower 157 to the ONE input of the flip-flop 153. In response to this pulse the flip-flop 153 will be switched to its ONE state, and in this manner the circulation of the pulse in the clock-loop is stopped. As a result the flip-flop 129 shown in FIGURE 4 stops switching back and forth between its two stable states and the advance of the distributor is stopped.

The output of the cathode follower 105 in FIGURE 4, in addition to being applied to the delay line 107, is also applied through an OR gate 161, shown in FIGURE 5, to the ZERO input of the flip-flop 153. Thus, after a jump operation has been performed and a pulse is applied to the OR gate 101, this pulse, after passing through the amplifier 103 and the cathode follower 105, will pass through the OR gate 161 to the ZERO input of the flip-flop 153 and switch the flip-flop 153 to its ZERO state. As a result of this action the flip-flop 153 will then again apply the enabling signal to the AND gate 119, and the pulse will then be permitted to circulate through the clock-loop. The output from the cathode follower 99 in FIGURE 4 is also applied through the OR gate 161 to the ZERO input of the flip-flop 153. Thus, each time the pulse recirculating through the clock-loop passes through the cathode follower 99, a pulse will be applied to the ZERO input of the flip-flop 153. This action insures that the flip-flop 153 remains in its ZERO state when a pulse is circulating in the clock-loop. The other input to the OR gate 159 is for purposes of stopping the clock for other operations of the computer which require this procedure.

Figure 6:
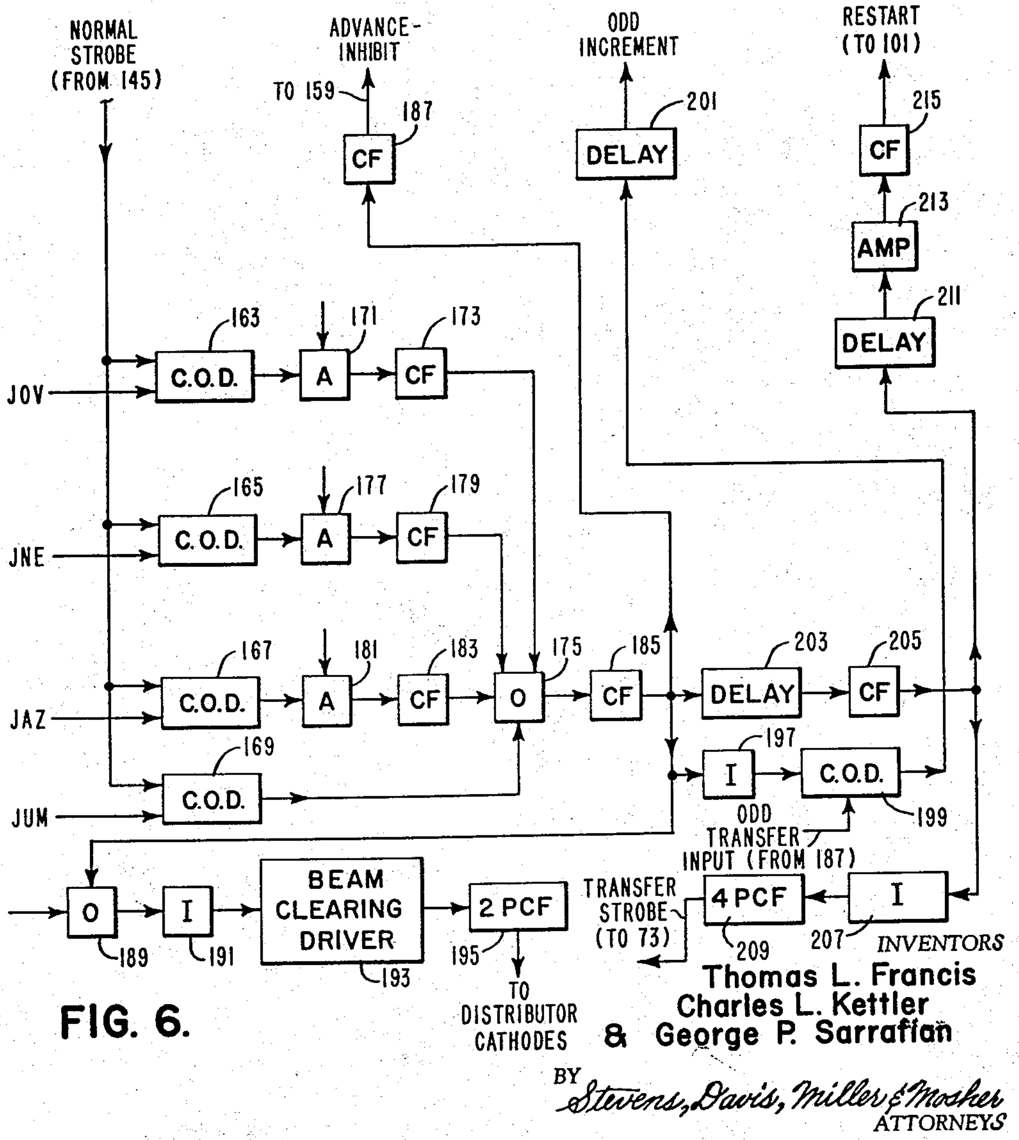
FIGURE 6 is a block diagram of the jump logic circuitry which controls the jump operations.

The details of the jump logic circuitry 71 of FIGURE 3 are shown in block form in FIGURE 6. As shown in this figure, the normal strobe pulse from the twelve parallel cathode followers 145, shown in FIGURE 4, is applied to four coincidence operation drivers 163, 165, 167, and 169. Each of these coincidence operation drivers comprises in cascade an AND gate, a cathode follower, an inverter, and a cathode follower. The input controlling the command JOV is applied to the coincidence operation driver 163. This input is connected to the hubs 63 shown in FIGURE 3. The input controlling the command JNE is applied to the coincidence operation driver 165. This input is connected to the hubs 61 shown in FIGURE 3. The input controlling the command JAZ is applied to the coincidence operation driver 167. This input is connected to the hubs 65 in FIGURE 3. The input controlling the command JUM is applied to the coincidence operation driver 169. This input is connected to the hubs 59 in FIGURE 3.

Each of the coincidence operation drivers 163, 165, 167, and 169 will produce an output pulse when it receives a coincidence of a normal strobe pulse with a pulse applied from the respective input of the commands JNE, JOV, JAZ, and JUM. The output from the coincidence operation driver 163 is applied to an AND gate 171. The AND gate 171 will be enabled to allow the pulse from the coincidence operation driver 163 to pass through whenever the required condition is present for a jump operation when the command JOV is given. A pulse passing through the AND gate 171 will pass through a cathode follower 173 to an OR gate 175. The output from the coincidence operation driver 165 is applied to an AND gate 177. The AND gate 177 will be enabled and allow the pulse from the coincidence operation driver 165 to pass through whenever the required condition is present for a jump operation when the command JNE is given. A pulse passing through the AND gate 177 will pass through a cathode follower 179 to the OR gate 175. The output from the coincidence operation driver 167 is applied to an AND gate 181. This AND gate will be enabled and allow the pulse from the coincidence operation driver 167 to pass through whenever the required condition is present for a jump operation when the command JAZ is given. A pulse passing through the AND gate 181 will pass through a cathode follower 183 to the OR gate 175. The output of the coincidence operation driver 169 is applied directly to the OR gate 175.

Any pulse applied to the OR gate 175 from the cathode followers 173, 179 or 183 or from the coincidence operation driver 169 will pass through the OR gate 175, through a cathode follower 185, and through a cathode follower 187 to the OR gate 159 of the advance inhibit circuit shown in FIGURE 5. Such a pulse will proceed to set the flip-flop 153 of the advance inhibit circuit into its ONE state. As a result the AND gate 119 in the clock shown in FIGURE 4 will no longer receive an enabling signal from the advance inhibit circuit and the pulse circulating in the clock-loop will stop. In this manner the clock is automatically stopped when the command JUM is given or one of the commands JAZ, JNE, or JOV is given and the required condition is present.

The pulse passing through the cathode follower 185 also passes through an OR gate 189 and an inverter 191 to a beam clearing driver 193. In response to receiving this pulse, the beam clearing driver 193 generates a large positive pulse which is applied through two parallel cathode followers 195 to the cathodes of the beam switching tubes which comprise the distributor. This large positive pulse will raise the potential of the cathodes of the beam switching tubes to equal or approach that of the spades. This action has the effect of clearing all of the beam switching tubes. In this manner the beam is cleared out of the tube from which the jump is made whenever the command JUM is given or one of the commands JOV, JNE, or JAZ is given and the required condition is present. A pulse may be applied externally through the OR gate 189 and the inverter 191 to cause the beam clearing driver 193 to clear the beam switching tubes. The purpose of this external input is to provide a means of clearing the beam switching tubes prior to the start of the operation of the computer.

The pulse passing through the cathode follower 185 will also pass through an inverter 197 to a coincidence operation driver 199. The hubs 87 shown in FIGURE 3 are connected to the other input of the coincidence operation driver 199. Whenever the coincidence operation driver 199 receives pulses from both the inverter 197 and one of the hubs 87, it will produce an output pulse which will pass through a delay line 201 to the clock. This pulse is the odd jump increment pulse and is applied to the OR gate 121 shown in FIGURE 4. In this manner the clock is incremented when a jump is made over an odd number of positions.

The pulse passing through the cathode follower 185 also passes through a delay line 203, a cathode follower 205, an inverter 207 to four parallel cathode followers 209. After passing through the four parallel cathode followers 209, the pulse becomes the transfer strobe pulse which is applied to the transfer drivers 73 as described with reference to FIGURE 3.

The pulse passing througth the cathode follower 205 is also applied to a delay line 211. The pulse, after passing through the delay line 211, is amplified by an amplifier 213 and then passes through a cathode follower 215. After passing through the cathode follower 215 the pulse is applied to the clock to restart the pulse circulating in the clock-loop. This pulse is applied to the OR gate 101 shown in FIGURE 4. In this manner the clock is automatically restarted after the jump operation has been performed.

It will be noted that the transfer strobe pulse is delayed by the delay line 203. This delay is necessary because the beam clearing operation by the beam clearing driver 193 must be completed prior to the application of the output pulse from the selected transfer driver 73 to the selected input 81. Otherwise the beam clearing operation would interfere with the forming of an electron beam at the new position. The delay line 211 prevents the starting of the clock until after the operation forming the beam in the new position has been completed.

Figure 7:
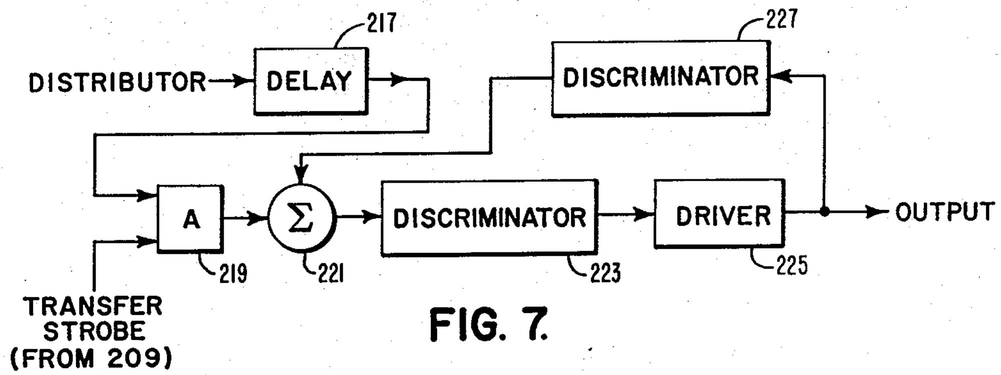
FIGURE 7 is a block diagram of a transfer driver circuit, which is one of a plurality of circuits used to produce necessary pulses to form an electron beam at a new position in the distributor in a jump operation.

The details of the transfer driver circuit which is used for each of the transfer drivers 73 shown in FIGURE 3 is shown in block form in FIGURE 7. The function of this circuit is to generate a wide 100 volt negative-going pulse in response to receiving a coincidence of a transfer strobe pulse with a distributor pulse. The wide 100 volt negative-going pulse is necessary to form the electron beam at a new position of the distributor, as it must lower the potential of the spade at the selected position of the distributor down to the potential of the cathode.

The distributor pulse is applied from one of the hubs 75 shown in FIGURE 3 through the delay line 217 to an AND gate 219. The transfer strobe pulse from the four parallel cathode followers 209 shown in FIGURE 6 is applied to the AND gate 219. In order for the AND gate 219 to produce an output pulse, it must receive simultaneously the pulse from the distributor through the delay line 217 and the transfer strobe pulse. The transfer strobe pulse is delayed because of the delay line 203. Ordinarily, the output pulse from the distributor would be wide enough to coincide with the transfer strobe pulse, even though the transfer strobe pulse is delayed. However, in a jump operation, the output pulse of the distributor is ended by a clearing operation, and this makes the distributor pulse end sooner. Therefore, it is necessary to delay the distributor pulse by means of delay line 217 to make it coincide with the transfer strobe pulse.

The AND gate 219, upon receiving simultaneously the transfer strobe pulse and the distributor pulse, applies an output pulse through a summing circuit 221 and through a preset noise discriminator 223 (in one embodiment, this was a 10-volt discriminator) to a driver 225. The output of the driver 225 is applied through another preset noise discriminator 227 to the summing circuit 221 to provide positive feedback. This positive feedback makes the circuit operate like a univibrator in response to the output pulse from the AND gate 219. The output of the driver 225 is the transfer driver output. The pulse produced from this output is used to drive the input 81 at the selected position of the distributor shown in FIGURE 3.

The pulse width from the AND gate 219 is determined essentially by the width of the transfer strobe pulse. The width of the transfer strobe pulse in turn is determined by the width of the normal strobe pulse. This width is wide enough for most of the computer operations, and is determined by the beam switching tube physics and the circuit wiring layout. However, the output pulse from the transfer driver must be considerably wider so that the reforming of the electron beam will be dependable. The univibrator action produced by the positive feedback in the transfer driver provides the necessary widening of the output pulse from the AND gate 219. Because of the large swing of signals used in the system, noise picked up between adjacent channels is a serious problem, and could cause unselected transfer drivers to be fired. The discriminator 223 insures against such malfunctioning by discriminating against 10 volts of noise signal. Because of the physical construction of the distributor, very long parallel lines are used for the transfer driver outputs. The capacitive and inductive coupling between these lines would normally be enough to fire unselected transfer drivers. The discriminator 227 prevents this malfunctioning by discriminating against 10 volts of noise signal.

Figure 8:
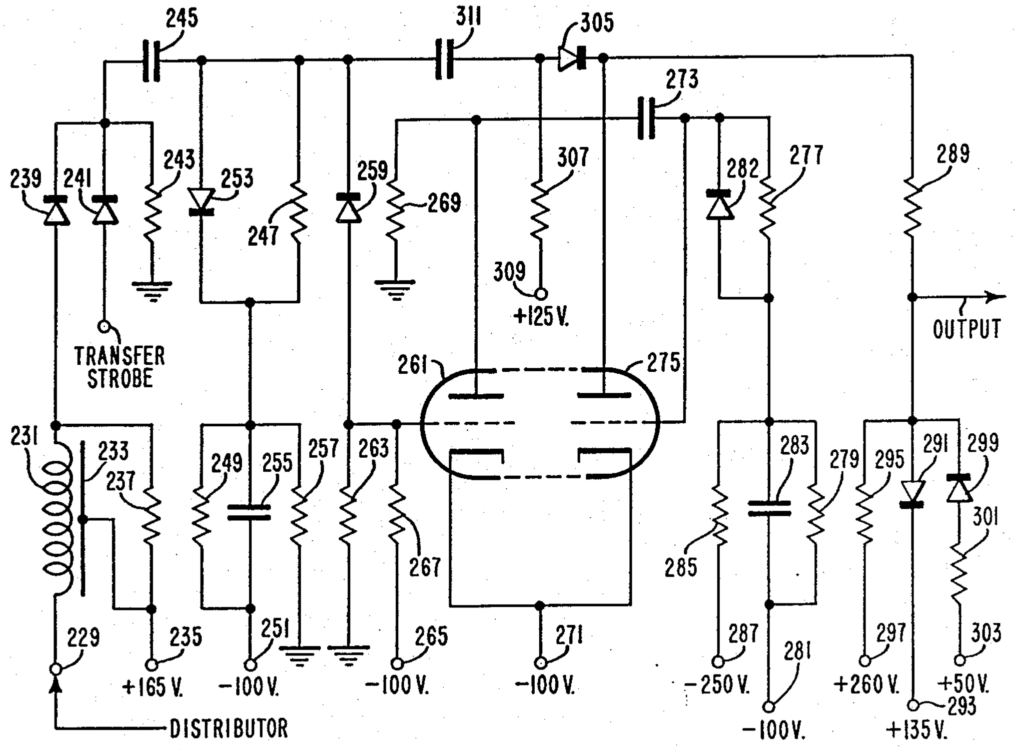
FIGURE 8 is a circuit diagram of a transfer driver circuit.

In FIGURE 8, there is shown a diagram of the transfer driver circuit, which is used in each of the transfer drivers 73 shown in FIGURE 3. As shown in FIGURE 8, the distributor pulse is applied over a conductor 229 to one side of an inductor coil 231. A plate 233 makes a capacitive coupling with the coils of the inductor 231 and is connected to a source of reference voltage of +165 volts applied at a terminal 235. The inductor coil 231 together with the capacitive plate 233 comprise the delay line 217 shown in FIGURE 7. A 5.1 kilohm resistor 237 is connected from the other end of the coil 231 to the source of positive voltage at terminal 235. The resistor 237 provides a load for the distributor pulse after it has passed through the delay line. The output of the delay line at the junction of the coil 231 and the resistor 237 is connected to the anode of a diode 239. The transfer strobe pulse is applied to the anode of a diode 241. The cathodes of the diodes 239 and 241 are connected together and to ground through a 56 kilohm resistor 243. Since the transfer strobe pulse and the distributor pulse are both negative going pulses, the diodes 239 and 241 comprise an AND gate, which is the AND gate 219 shown in FIGURE 7. The resistor 243 comprises a load resistor at the output of the AND gate.

The output of the AND gate at the junction of the cathodes of the diodes 239 and 241 is connected through a 500 micro-microfarad capacitor 245, a 470 kilohm resistor 247 and a 3.3 kilohm resistor 249 in series circuit to a −100 volt supply applied at a terminal 251. A diode 253 shunts the resistor 247, the anode of the diode 253 being connected to the junction between a capacitor 245 and resistor 247. A 0.0047 microfarad capacitor 255 shunts the resistor 249. The junction between the resistor 249 and the resistor 247 is connected to ground through a 26 kilohm resistor 257. The cathode of a diode 259 is connected to the junction between the capacitor 245 and the resistor 247 and the anode of this diode is connected to the grid of a triode 261. The grid of the triode 261 is connected to ground through a 220 kilohm resistor 263 and to a source of −100 volts applied at a terminal 265 through a 91 kilohm resistor 267. The plate of the triode 261 is connected to ground through a 2.7 kilohm resistor 269. The cathode of the triode 261 is connected directly to a source of −100 volts applied at a terminal 271. The plate of the triode 261 is connected through a 200 micro-microfarad capacitor 273 to the grid of a triode 275. The grid of the triode 275 is connected through a series circuit of a 27 kilohm resistor 277 and a 10 kilohm resistor 279 to a source of −100 volts applied at a terminal 281. A diode 282 shunts the resistor 277, the cathode of the diode 282 being connected to the grid of the triode 275. A 0.0047 microfarad capacitor 283 shunts the resistor 279. The junction between the resistors 277 and 279 is connected through a 68 kilohm resistor 285 to a source of −250 volts applied at a terminal 287. The cathode of the triode 275 is connected directly to the source of −100 volts at terminal 271. The plate of the triode 275 is connected through a series circuit comprising a 470 ohm resistor 289 and a diode 291 to a source of +135 volts applied at a terminal 293. The diode 291 has its cathode connected through a 6.8 kilohm resistor 295 to a source of +260 volts applied at a terminal 297. The anode of the diode 291 is also connected through a series circuit comprising a diode 299 and a 2.7 kilohm resistor 301 to a source of +50 volts applied at a terminal 303, the cathode of the diode 299 being connected to the anode of the diode 291. The output of the transfer driver is taken from the junction between the resistor 289 and the diode 291. The plate of the triode 275 is also connected through a series circuit comprising a diode 305 and a 27 kilohm resistor 307 to a source of +125 volts applied at a terminal 309, the cathode of the diode 305 being connected to the plate of the triode 275. The junction between the resistor 307 and the diode 305 is connected through a 110 micro-microfarad capacitor 311 to the junction between the capacitor 245 and diode 259.

The negative output pulse from the AND gate comprising the diodes 239 and 241 will pass through the capacitor 245 and the diode 259 to the grid of the triode 261. The diode 259 comprises the discriminator 223 shown in FIGURE 7. The triode 261 inverts and augments the power of the pulse applied at its grid. The inverted output pulse of the triode 261 appears at the plate thereof and is applied through capacitor 273 to the grid of the triode 275. The triode 275 reinverts the pulse and further increases its power. The reinverted output pulse of the triode 275 is produced at the plate of this triode and is applied through the resistor 289 to the output of the transfer driver circuit. The reinverted output pulse at the plate of the triode 275 is also applied through the diode 305 and the capacitor 311 to the junction between the capacitor 245 and the diode 259. The diode 305 comprises the discriminator 227 of FIGURE 7. The pulse passing through the capacitor 311 is summed with the output pulse which caused it from the AND gate comprising the diodes 239 and 241. This summation takes place over the resistor 247 which comprises the summing circuit 221 of FIGURE 7. Since the pulse passing through the capacitor 311 has been inverted twice it augments the pulse coming through the capacitor 245. The reinverted pulse therefore operates as positive feedback when it is summed with the pulse from the AND gate and is applied to the grid of the triode 261 through the diode 259. This action causes the triodes 261 and 275 to operate as a univibrator and to thereby produce an output pulse which is widened from the output pulse from the AND gate comprising the diodes 239 and 241. The triodes 261 and 275 thus comprise the driver 225 of FIGURE 7.

The above description is of a preferred embodiment of the invention and many modifications may be made thereto without departing from the spirit and scope of the invention, which is limited only as defined in the appended claims.

What is claimed is:

1. In a computer having a distributor comprising a plurality of magnetron beam switching tubes, each of said magnetron beam switching tubes comprising an electronic switch having a plurality of positions, each of said positions comprising a target, a spade, and a grid, each of said magnetron beam switching tubes further comprising a cathode, each of said magnetron beam switching tubes being capable of forming an electron beam flowing from its cathode and holding said electron beam on one of said targets, said distributor further comprising circuit means (1) to switch said electron beam from target to target in said magnetron beam switching tubes and (2) in response to said electron beam being switched to a predetermined target in each of said beam switching tubes, to form the electron beam in the next magnetron beam switching tube of said distributor and clear the magnetron beam switching tube in which the beam was formed to thereby advance said distributor so that output pulses are produced sequentially from said targets; the improvement comprising means to generate a transfer strobe pulse in response to receiving a distributor output pulse, means to selectively connect any of a plurality of said targets to said transfer strobe generating means, a plurality of transfer drivers connected to receive said transfer strobe pulse, each of said transfer drivers comprising a driver circuit means operative in response to receiving a coincidence of said transfer strobe pulse and a distributor output pulse to generate an output pulse which when applied to one of said spades will cause the formation of an electron beam at the position of such spade, means to selectively connect any of said plurality of targets to any of said transfer drivers, and means to selectively connect the outputs of any of said transfer drivers to any of said spades.

2. A computer improvement as recited in claim 1 wherein said driver circuit means is further characterized in that it is a means to generate said output pulse substantially wider than said transfer strobe pulse.

3. In a computer having a distributor comprising a plurality of magnetron beam switching tubes, each of said magnetron beam switching tubes comprising an electronic switch having a plurality of positions, each of said positions comprising a target, a spade, and a grid, each of said magnetron beam switching tubes further comprising a cathode, each of said magnetron beam switching tubes being capable of forming an electron beam flowing from its cathode and holding said electron beam on one of said targets, said distributor further comprising circuit means (1) to switch said electron beam from target to target in said magnetron beam switching tubes and (2) in response to said electron beam being switched to a predetermined target in each of said beam switching tubes to form the electron beam in the next magnetron beam switching tube of said distributor and clear the magnetron beam switching tube in which the beam was formed to thereby advance said distributor so that output pulses are produced sequentially from said targets; the improvement comprising means to generate a transfer strobe pulse in response to receiving a distributor output pulse only if a predetermined condition is present, means to selectively connect any one of a plurality of said targets to said transfer strobe generating means, a plurality of transfer drivers connected to receive said transfer strobe pulse, each of said transfer drivers comprising a means operative in response to receiving a coincidence of said transfer strobe pulse and a distributor output pulse to generate an output pulse which when applied to one of said spades will cause the formation of an electron beam at the position of such spade, means to selectively connect any of said plurality of targets to any of said transfer drivers, and means to selectively connect the outputs of any of said transfer drivers to any of said spades.

4. In a computer having a distributor comprising a plurality of magnetron beam switching tubes, each of said magnetron beam switching tubes comprising an electronic switch having a plurality of positions, each of said positions comprising a target, a spade, and a grid, each of said magnetron beam switching tubes further comprising a cathode, each of said magnetron beam switching tubes being capable of forming an electron beam flowing from its cathode and holding said electron beam on one of said targets, said distributor further comprising circuit means (1) to switch said electron beam from target to target in said magnetron beam switching tubes and (2) in response to said electron beam being switched to a predetermined target in each of said beam switching tubes to form the electron beam in the next magnetron beam switching tube of said distributor and clear the magnetron beam switching tube in which the beam was formed to thereby advance said distributor so that output pulses are produced sequentially from said targets; the improvement comprising means having a plurality of control inputs to generate a transfer strobe pulse in response to receiving a distributor output pulse on one of said control inputs only if a predetermined condition is present, said predetermined condition being different from each of said inputs, means to selectively connect any of a plurality of said targets to any of said control inputs, a plurality of transfer drivers connected to receive said transfer strobe pulse, each of said transfer drivers comprising a means operative in response to receiving a coincidence of said transfer strobe pulse and a distributor output pulse to generate an output pulse which then applied to one of said spades will cause the formation of an electron beam at the position of such spade, means to selectively connect any of said plurality of targets to any of said transfer drivers, and means to selectively connect the outputs of any of said transfer drivers to any of said spades.

5. In a computer having a distributor comprising a plurality of magnetron beam switching tubes, each of said magnetron beam switching tubes comprising an electronic switch having a plurality of positions, each of said positions comprising a target, a spade, and a grid, each of said magnetron beam switching tubes further comprising a cathode, each of said magnetron beam switching tubes being capable of forming an electron beam flowing from its cathode and holding said electron beam on one of said targets, said distributor further comprising circuit means (1) to switch said electron beam from target to target in said magnetron beam switching tubes and (2) in response to said electron beam being switched to a predetermined target in each of said beam switching tubes to form the electron beam in the next magnetron beam switching tube of said distributor and clear the magnetron beam switching tube in which the beam was formed to thereby advance said distributor so that output pulses are produced sequentially from said targets; the improvement comprising a control input, means for selectively connecting any of a plurality of said targets to said control input, means responsive to a distributor output pulse being applied to said control input to clear all of said beam switching tubes, means to generate a transfer strobe pulse after said beam switching tubes have been cleared in response to a distributor output pulse being applied to said control input, a plurality of transfer drivers each connected to receive said transfer strobe pulse, means to selectively connect any of said plurality of targets to any of said transfer drivers, each of said transfer drivers having a means to delay an applied distributor output pulse, each of said transfer drivers comprising a means operative response to the simultaneity of said transfer strobe pulse and an applied distributor output pulse after it has been delayed to generate an output pulse which, when applied to one of said spades, will cause the formation of an electron beam at the position of such spade, and means to selectively connect any said spades to the output of any of said transfer drivers.

6. In a computer having a distributor comprising a plurality of magnetron beam switching tubes, each of said magnetron beam switching tubes comprising an electronic switch having a plurality of positions, each of said positions comprising a target, a spade, and a grid, each of said magnetron beam switching tubes further comprising a cathode, each of said magnetron beam switching tubes being capable of forming an electron beam flowing from its cathode and holding said electron beam on one of said targets, said distributor further comprising circuit means (1) to switch said electron beam from target to target in said magnetron beam switching tubes and (2) in response to said electron beam being switched to a predetermined target in each of said beam switching tubes to form the electron beam in the next magnetron beam switching tube of said distributor and clear the magnetron beam switching tube in which the beam was formed to thereby advance said distributor so that output pulses are produced sequentially from said targets; the improvement comprising a control input, means to selectively connect any of a plurality of said targets to said control input, means operative in response to a distributor output pulse being applied to said control input to stop said circuit means from advancing said distributor, means to clear said magnetron beam switching tubes, means to reform an electron beam at a new and different restarting position in said distributor in response to a distributor output pulse being applied to said control input, and means to restart said circuit means to advance said distributor after the electron beam is formed in said new position.

7. In a computer having a distributor comprising a plurality of magnetron beam switching tubes, each of said magnetron beam switching tubes comprising an electronic switch having a plurality of positions, each of said positions comprising a target, a spade, and a grid, each of said magnetron beam switching tubes further comprising a cathode, each of said magnetron beam switching tubes being capable of forming an electron beam flowing from its cathode and holding said electron beam on one of said targets, said distributor further comprising circuit means (1) to switch said electron beam from target to target in said magnetron beam switching tubes and (2) in response to said electron beam being switched to a predetermined target in each of said beam switching tubes to form the electron beam in the next magnetron beam switching tube of said distributor and clear the magnetron beam switching tube in which the beam was formed to thereby advance said distributor so that output pulses are produced sequentially from said targets; the improvement comprising a control input, means to selectively connect any of a plurality of said targets to said control input, means to stop the advance of said distributor by said circuit means in response to a distributor output pulse being applied to said control input, means to clear all of said magnetron beam switching tubes in response to a distributor pulse being applied to said control input, means to form an electron beam at a selected new position after said beam switching tubes have been cleared in response to a distributor output pulse being applied to said control input, and means to restart the advance of said distributor after the electron beam has been formed in said new position in response to a distributor output pulse being applied to said control input.

8. In a computer having a distributor comprising a plurality of magnetron beam switching tubes, each of said magnetron beam switching tubes comprising an electronic switch having a plurality of positions, each of said positions comprising a target, a spade, and a grid, each of said magnetron beam switching tubes further comprising a cathode, each of said magnetron beam switching tubes being capable of forming an electron beam flowing from its cathode and holding said electron beam on one of said targets, said distributor further comprising circuit means (1) to switch said electron beam from target to target in said magnetron beam switching tubes and (2) in response to said electron beam being switched to a predetermined target in each of said beam switching tubes, to form the electron beam in the next magnetron beam switching tube of said distributor and clear the magnetron beam switching tube in which the beam was formed so that output pulses are produced sequentially from said targets, said circuit means including a clock means to apply different potentials to said grids at alternate positions in said magnetron beam switching tubes and to periodically reverse said potentials to thereby advance said distributor; the improvement comprising a first control input, means to selectively connect any of a plurality of said targets to said first control input, means responsive to a distributor output pulse applied to said control input to stop the advance of said distributor by said clock means, a second control input, means to selectively connect any of said plurality of targets to said second control input, means responsive to a coincidence of distributor output pulses applied at said first control input and at said second control input for incrementing said clock means to cause it to reverse said potentials, means to cause the formation of an electron beam at a new selected position in said distributor in response to a distributor output pulse being applied to said first control input, and means operative in response to a distributor output pulse applied to said control input to restart the advance of said distributor by said clock means after the electron beam has been formed in said new position.

References Cited in the file of this patent

UNITED STATES PATENTS

| | | |
|---|---|---|
| 2,536,917 | Dickinson | Jan. 2, 1951 |
| 2,807,748 | Lee | Sept. 24, 1957 |

OTHER REFERENCES

Electronic Engineering, April 1954, vol. XXVI, No. 314, pp. 157–160, "An Industrial Batching Counter," Brierley.